US010503557B2

(12) United States Patent
Egger et al.

(10) Patent No.: US 10,503,557 B2
(45) Date of Patent: Dec. 10, 2019

(54) METHOD OF PROCESSING OPENCL KERNEL AND COMPUTING DEVICE THEREFOR

(71) Applicant: SAMSUNG ELECTRONICS CO., LTD., Suwon-si, Gyeonggi-do (KR)

(72) Inventors: Bernhard Egger, Seoul (KR); Su-Rim Oh, Seoul (KR); Younghyun Cho, Seoul (KR); Dong-Hoon Yoo, Suwon-si (KR)

(73) Assignees: SAMSUNG ELECTRONICS CO., LTD., Suwon-si, Gyeonggi-Do (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 91 days.

(21) Appl. No.: 15/787,219

(22) Filed: Oct. 18, 2017

(65) Prior Publication Data

US 2018/0181443 A1 Jun. 28, 2018

(30) Foreign Application Priority Data

Dec. 27, 2016 (KR) .................. 10-2016-0180133

(51) Int. Cl.
*G06F 9/50* (2006.01)
(52) U.S. Cl.
CPC .......... *G06F 9/5044* (2013.01); *G06F 9/5027* (2013.01)
(58) Field of Classification Search
None
See application file for complete search history.

(56) References Cited

U.S. PATENT DOCUMENTS

| 8,433,662 | B2 | 4/2013 | Ferringer et al. |
| 9,015,683 | B2 | 4/2015 | Cho et al. |
| 2003/0195938 | A1* | 10/2003 | Howard ............... G06F 8/45 709/208 |
| 2009/0043988 | A1 | 2/2009 | Archer et al. |
| 2009/0307699 | A1* | 12/2009 | Munshi ............... G06F 9/4843 718/102 |
| 2011/0161965 | A1 | 6/2011 | Im et al. |

(Continued)

FOREIGN PATENT DOCUMENTS

| JP | 2012-094072 | 5/2012 |
| JP | 5427245 | 2/2014 |

(Continued)

OTHER PUBLICATIONS

Lee et al., "An OpenCL Framework for Heterogeneous Multicores With Local Memory", PACT '10, Sep. 11-15, 2010, Vienna, Austria.

(Continued)

*Primary Examiner* — Daxin Wu
(74) *Attorney, Agent, or Firm* — F. Chau & Associates, LLC

(57) ABSTRACT

A multi-core computing device includes a control core group having first low-level control cores and a processing core group. The control core group allocates work groups for executing an Open Computing Language (OpenCL) kernel to the first low-level control cores and first processing cores among the processing core group. The processing core group performs processing of the work groups allocated by the control core group outputs results of the processing. The control cores are hierarchically grouped.

18 Claims, 17 Drawing Sheets

(56) References Cited

U.S. PATENT DOCUMENTS

| | | |
|---|---|---|
| 2012/0042215 A1 | 2/2012 | Murayama et al. |
| 2012/0331278 A1 | 12/2012 | Breternitz et al. |
| 2013/0141443 A1 | 6/2013 | Schmidt et al. |
| 2013/0212594 A1 | 8/2013 | Choi et al. |
| 2016/0147516 A1* | 5/2016 | Rajnak ............... G06F 16/2455 717/150 |

FOREIGN PATENT DOCUMENTS

| | | |
|---|---|---|
| KR | 10-1284195 | 7/2013 |
| KR | 1020130093995 | 8/2013 |
| KR | 1020140125893 | 10/2014 |
| KR | 10-1640848 | 7/2016 |

OTHER PUBLICATIONS

"Hierarchical Manycore Resource Management Framework Using Control Processors", Feb. 2017, SNU, Computer Science Engineering, Thesis, Student No. 2015-21249.

Lee et al., "An OpenCL Framework for Homogeneous Manycores With No Hardware Cache Coherence", Oct. 2011 International Conference on Parallel Architectures and.Compilation Techniques, IEEE Computer Society. pp. 56-67.

Kim et al., "SnuCL: An OpenCL Framework for Heterogeneous CPU/GPU Clusters", ICS'12, Jun. 25-29, 2012, San Servolo Island, Venice, Italy, pp. 341-351.

Extended European Search Report dated Apr. 30, 2018 in corresponding European Application No. 17202801.1-1221.

* cited by examiner

FIG. 8

```
__kernel mat_add(__global int* a, __global int* b, __global int* c)
{
  int id_x = get_global_id(0);    // global_id[0]
  int id_y = get_global_id(1);    // global_id[1]
  c[id_x][id_y] = a[id_x][id_y] + b[id_x][id_y];
}
```

FIG. 11

```
/* below: CHECK IDs OF ALLOCATED WORK GROUPS THROUGH HARDWARE SUPPORT */
wg_id = read_wg_id();

int main(int* a, int* b, int * c)
{
    group_id[0] = wg_id % wg_size[0];
    group_id[1] = wg_id / wg_size[0];
    global_id[0] = group_id[0] * local_size[0];
    global_id[1] = group_id[1] * local_size[1];

int id_x = global_id[0];
    int id_y = global_id[1];
    c[id_x][id_y] = a[id_x][id_y] + b[id_x][id_y];
}
```

FIG. 12

```
/* below: CHECK IDs OF ALLOCATED WORK GROUPS THROUGH HARDWARE SUPPORT */
wg_id = read_wg_id();

/* below: CHECK NUMBER OF SUCCESSIVELY ALLOCATED WORK GROUPS THROUGH HARDWARE SUPPORT */
num_wgs = read_num_wgs();

int main(int* a, int* b, int * c) {
    for (int wg = wg_id; wg < wg_id + num_wgs; wg_id++) {
        group_id[0] = wg_id % wg_size[0];
        group_id[1] = wg_id / wg_size[0];
        global_id[0] = group_id[0] * local_size[0];
        global_id[1] = group_id[1] * local_size[1];
        /* below:  execute work-groups (work items are coalesced,
        thus serialized execution) */
        for (int j = 0; j < local_size[1]; j++) {
            for (int i = 0; i < local_size[0]; i++) {
                int id_x = global_id[0];
                int id_y = global_id[1];
                c[id_x][id_y] = a[id_x][id_y] + b[id_x][id_y];
            }
```

FIG. 13

| SCHEDULING METHODS | HARDWARE SUPPORT | DELAY TIME |
|---|---|---|
| CONCENTRATED SCHEDULING | BUFFER | 2,516us |
| | NO BUFFER | 6,767us |
| DISTRIBUTED SCHEDULING | BUFFER | 284us |
| | NO BUFFER | 589us |

FIG. 14

| APPLICATIONS | APPLICATION FEATURES | WORK |
|---|---|---|
| PI estimation | Computation-intensive | Monte carlo PI estimation |
| Small buffer copy | Data-intensive | Load and copy data to buffer |
| Big buffer copy | Data-intensive | Load and copy data to buffer |
| SpMV (unbalanced matrix) | Irregular computation | Sparse unbalanced matrix and dense vector multiplication |

METHOD OF PROCESSING OPENCL KERNEL AND COMPUTING DEVICE THEREFOR

CROSS-REFERENCE TO RELATED APPLICATION

This application claims the benefit of and priority to Korean Patent Application No. 10-2016-0180133, filed on Dec. 27, 2016, in the Korean Intellectual Property Office, the disclosure of which is incorporated by reference in its entirety herein.

BACKGROUND

1. Technical Field

The present disclosure relates to a method of processing an Open Computing Language (OpenCL) kernel and a computing device for the method.

2. Discussion of Related Art

Computing devices have been developed to have a structure in which a plurality of cores or processors are included in a single integrated circuit so as to satisfy performance requirements of applications. For example, a multi-core processor refers to a processor in which two or more cores having an arithmetic function are integrated. Many-core processors integrate sixteen or more cores in a single processor. Multi-core processors and many-core processors may be included in devices having multimedia chips and embedded in TVs or portable devices.

Open Computing Language (OpenCL) is a framework for writing programs for execution across multiple platforms. In other words, OpenCL is an open general-purpose parallel computing framework for programs executing across multiple platforms such as general-purpose multi-core central processing units (CPUs), field-programmable gate arrays (FPGAs), and graphics processing units (GPUs). OpenCL expands the capabilities of GPUs to areas other than graphics processing. Thus, various attempts have been made to efficiently process OpenCL programs using multi-core computing devices.

SUMMARY

At least one embodiment of the inventive concept provides a method for processing an Open Computing Language (OpenCL) kernel and a computing device for the method, wherein a hierarchical control core group allocates work groups for executing the OpenCL kernel to a processing core group.

According to an exemplary embodiment of the inventive concept, a multi-core computing device includes: a control core group including first low-level control cores and a processing core group. The control core group is configured to allocate work groups for executing an OpenCL kernel to first low-level control cores and first processing cores. The processing core group includes at least one of the first processing cores. The processing core group is configured to process the work groups allocated by the control core group and output results of the processing of the work groups. A plurality of control cores included in the control core group are hierarchically grouped according to a number of the first processing cores to which the work groups are allocated by the control cores.

According to an exemplary embodiment of the inventive concept, a method of processing an OpenCL kernel includes: allocating, by a control core group, work groups for executing an OpenCL kernel to first low-level control cores and first processing cores; processing, by a processing core group including at least one of the first processing cores, the allocated work groups; and outputting, by the processing core group, results of the processing of the work groups. A plurality of control cores of the control core group are hierarchically grouped according to a number of the first processing cores to which the work groups are allocated by the control cores.

According to an exemplary embodiment of the inventive concept, there is provided a non-transitory computer-readable recording medium on which a method of executing the OpenCL kernel processing method on a computer is recorded.

According to an exemplary embodiment of the inventive concept, a multi-core computing device includes a processing core group having a plurality of first processing cores and a plurality of second processing cores, a root control core configured to receive information about execution of an OpenCL kernel from a host processor, the information indicating work groups for executing the OpenCL kernel, a first leaf control core connected between the root control core and the first processing cores, and a second leaf control core connected between the root control core and the second processing cores. The root control core sends a first part of the work groups to the first leaf control core and a second part of the work groups to the second intermediate control core.

BRIEF DESCRIPTION OF THE DRAWINGS

Embodiments of the inventive concept will be more clearly understood from the following detailed description taken in conjunction with the accompanying drawings in which:

FIG. 8 is a view illustrating an OpenCL kernel code executed on processing cores, according to an exemplary embodiment of the inventive concept;

FIG. 11 is a view illustrating an OpenCL kernel code executed on processing cores in a case in which a buffer is added, according to an exemplary embodiment of the inventive concept;

FIG. 12 is a view illustrating an OpenCL kernel code for processing OpenCL work groups when a buffer is added, according to an exemplary embodiment of the inventive concept;

FIGS. 13 and 14 are tables illustrating experimental conditions for evaluating the performance of computing devices according to exemplary embodiments of the inventive concept;

DETAILED DESCRIPTION OF THE EXEMPLARY EMBODIMENTS

Figure 1:
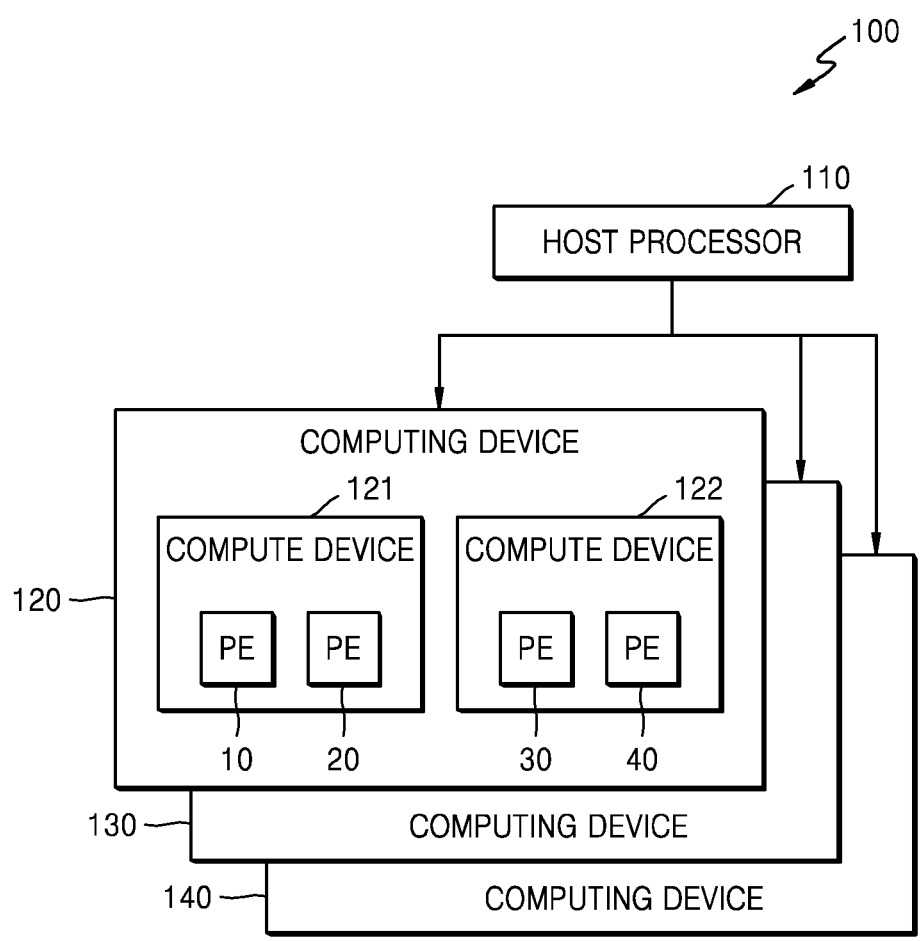
FIG. 1 is a view illustrating an OpenCL platform.

Reference will now be made in detail to exemplary embodiments of the inventive concept, examples of which are illustrated in the accompanying drawings, wherein like reference numerals refer to like elements throughout. In this regard, the present exemplary embodiments may have different forms and should not be construed as being limited to the descriptions set forth herein.

In the following descriptions of the exemplary embodiments, when a portion or element is referred to as being connected to another portion or element, the portion or element may be directly connected to the other portion or element, or may be electrically connected to the other portion or elements with intervening portions or elements being therebetween. In the descriptions of the embodiments, terms such as unit or module are used to denote a unit having at least one function or operation and implemented with hardware, software, or a combination of hardware and software.

Hereinafter, exemplary embodiments of the will be described with reference to the accompanying drawings.

FIG. 1 is a view illustrating an Open Computing Language (OpenCL) platform 100.

OpenCL is one of a number of programming languages for realizing operations of heterogeneous compute devices simultaneously. Thus, programs written in OpenCL may be executed across multiple platforms.

Referring to FIG. 1, the OpenCL platform 100 includes a host processor 110 and at least one computing device such as computing devices 120 to 140.

The host processor 110 may be a processor on which a host program is executed and may define a work space for executing a kernel. Here, the work space may be divided into work groups each including a plurality of work items. Each work item is a point of the work space that is the smallest unit of work. For example, the host processor 110 may be a general-purpose central processing unit (CPU). However, the host processor 110 is not limited thereto.

In an embodiment, the kernel includes kernel code such as a multi-thread program code. The kernel code may include one or more statements. A statement is an individual instruction or significant expression which composes a program, and may include an instruction sequence. In a multi-threaded program execution model, an execution domain is divided into multiple work items so that a kernel code may be executed with respect to each work item. In an embodiment, each work item is executed in a separate software thread. In an embodiment, some work items are synchronized for sharing data. The work items to be synchronized may be classified into one work group. The execution domain of a multi-thread program can be divided into a plurality of work groups.

The computing devices 120 to 140 may include at least one compute device such as compute devices 121 and 122. In addition, the compute devices 121 and 122 may include at least one processing element (PE) such as PEs 10 to 40. The compute devices 121 and 122 may be units for processing work groups, and the PEs 10 to 40 may be units for processing work items. For example, the compute devices 121 and 122 may process a work group received from the host processor 110, and the PEs 10 to 40 may process work items included in the work group. Therefore, the work items of the work group may be processed in parallel by the PEs 10 to 40. Each of the computing devices 120 to 140 may be a many-core processor or multi-core processor. However, the computing devices 120 to 140 are not limited thereto. The computing devices 120 to 140 may be any processor including at least one core. In an embodiment, each compute device is a core and each PE is a hardware thread capable of processing a software thread.

An OpenCL program may include one host program and at least one kernel. The host program may be executed by the host processor 110 and may order the compute devices 120 to 140 to perform a calculation by sending commands through the host processor 110 or may manage memories of the compute devices 120 to 140. Here, the kernel refers to a program executed on the compute devices 120 to 140 and may be referred to as an OpenCL kernel or a kernel code.

When a kernel is executed on a computing device including a plurality of cores, each core may correspond to a compute device such as the compute devices 121 and 122. In other words, cores of a computing device may process work groups allocated thereto, and processing elements, such as the PEs 10 to 40, included in the cores may process work items included in the work groups.

A computing device may receive work groups from the host processor 110. For example, the host processor 110 may dynamically allocate work groups to cores according to results of processing of work groups in the cores. In an embodiment, the host processor 110 includes a work distribution manager for dynamically allocating work groups.

However, if a work distribution manager dynamically allocates work groups to a plurality of cores, the amount of distribution work (e.g., overhead) that the work distribution manager carries out may increase according to the number of the cores, and thus the performance of a computing device may decrease. In addition, if a work distribution manager statically allocates work groups to a plurality of cores, the work groups may be processed at different times, and thus the operational efficiency of a computing device may decrease. In addition, if the host processor 110 includes a work distribution manager, the host processor 110 may be heavily burdened.

If a core of a computing device is used as a work distribution manager, the core is not used to process work items. Therefore, a method of effectively allocating work groups is required for the case in which an OpenCL kernel is executed on a computing device having a plurality of cores.

Figure 2:
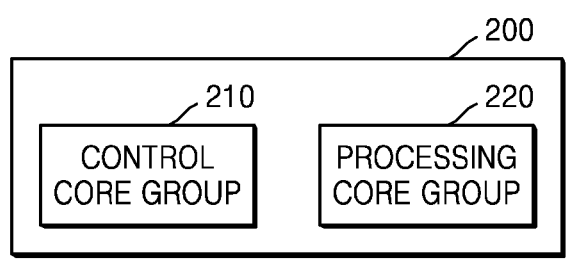
FIG. 2 is a block diagram illustrating a computing device according to an exemplary embodiment of the inventive concept.

FIG. 2 is a block diagram illustrating a computing device 200 according to an exemplary embodiment of the inventive concept.

The computing device 200 according to the embodiment may include a plurality of cores, and the cores may be grouped into a control core group 210 and a processing core group 220. The computing device 200 may further include general-purpose elements in addition to the elements illustrated in FIG. 2.

The computing device 200 illustrated in FIG. 2 may correspond to the computing devices 120 to 140 illustrated in FIG. 1.

The control core group 210 is a group of control cores allocating work groups for executing an OpenCL kernel to low-level control cores and processing cores. The specifications of the control cores may be the same as those of the processing cores. However, the control cores are not limited thereto.

The processing core group 220 is a group of processing cores configured to process work groups allocated by the control core group 210 and output results of the processing. In an embodiment, each of the processing cores includes at least one processing element. For example, the processing cores may correspond to cores of a many-core processor. However, the processing cores are not limited thereto.

In an embodiment, the control cores of the control core group 210 are hierarchically grouped according to the number of the processing cores to which work groups are allocated by the control cores. An example of a hierarchical grouping of the control core group 210 will be described with reference to FIG. 3.

Figure 3:
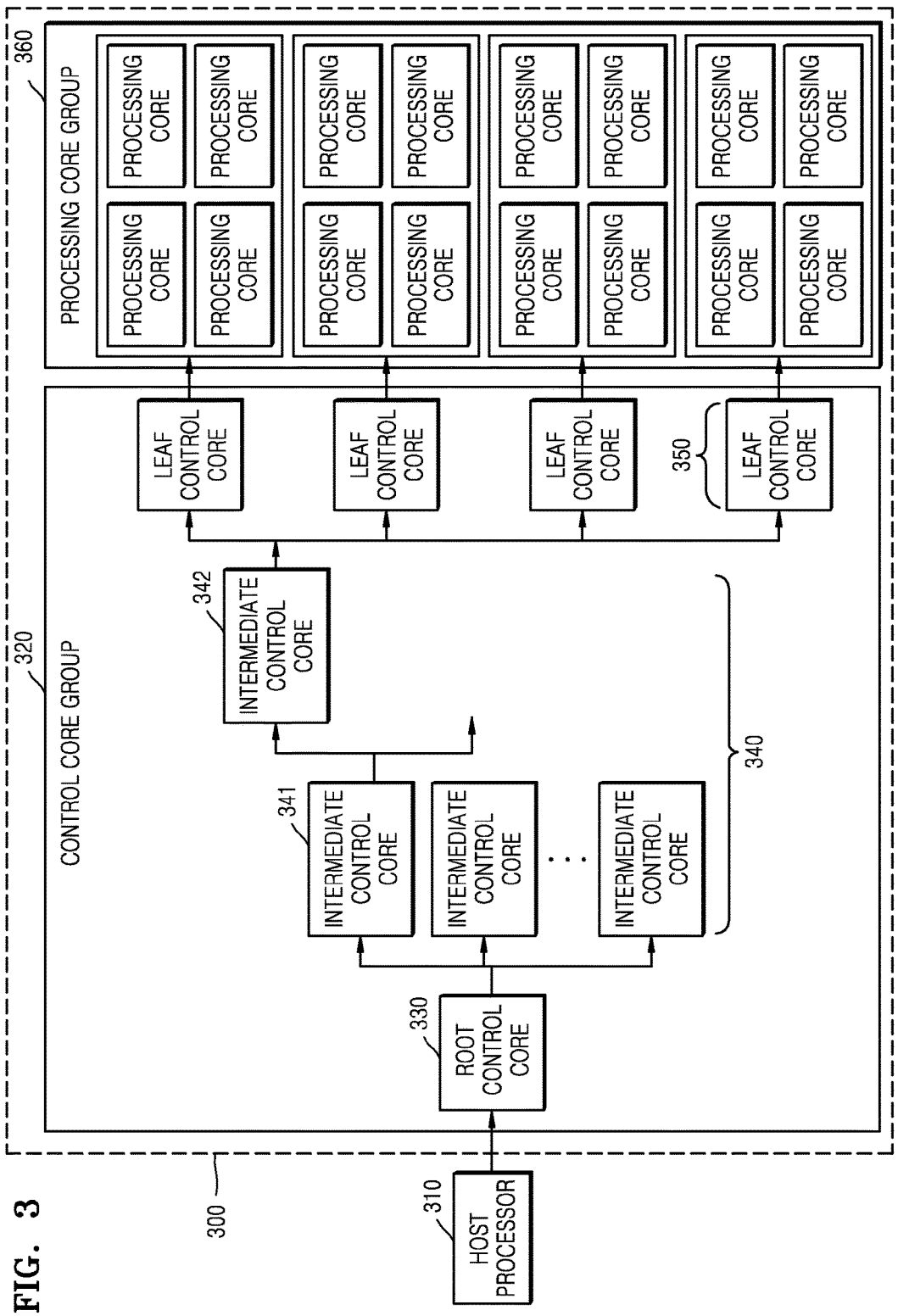
FIG. 3 is a block diagram illustrating a computing device according to an exemplary embodiment of the inventive concept.

FIG. 3 is a block diagram illustrating a computing device 300 according to an exemplary embodiment of the inventive concept.

Referring to FIG. 3, the computing device 300 includes a control core group 320 and a processing core group 360. The control core group 320 includes a root control core 330 and a leaf control core group 350. In addition, the computing device 300 may further include an intermediate control core group 340 according to the hierarchy of the control core group 320. The processing core group 360 shown in FIG. 3 corresponds to the processing core group 220 shown in FIG. 2, and thus a detailed description of the processing core group 360 is not provided here.

In an embodiment, when the root control core 330 receives information about execution of an OpenCL kernel, the root control core 330 allocates work groups to low-level control cores. In FIG. 3, control cores below the root control core 330 are indicated as being in the intermediate control core group 340. The control cores below the root control core 330 may be included in at least one of the intermediate control core group 340 and the leaf control core group 350 according to the hierarchy of the control core group 320.

In an embodiment, the root control core 330 receives information about execution of an OpenCL kernel from a host processor 310. For example, when an OpenCL kernel is executed, the host processor 310 may generate information about the execution of the OpenCL kernel and transmit the information to the root control core 330. The information about the execution of the OpenCL kernel may include at least one of the total number of work groups for executing the OpenCL kernel and information about applications included in the OpenCL kernel.

The leaf control core group 350 may include a plurality of leaf control cores configured to receive information about work groups allocated by high-level control cores and allocate the work groups to processing cores. In FIG. 3, control cores above the leaf control core group 350 are indicated as being in the intermediate control core group 340. However, each control core above the leaf control core group 350 may be at least one of the root control core 330 and a control core of the intermediate control core group 340 according to the hierarchy of the control core group 320.

The intermediate control core group 340 may include a plurality of intermediate control cores and be configured to receive information about work groups allocated by the root control core 330 and allocate the work groups to the leaf control core group 350. In addition, the intermediate control core group 340 may be arranged into a plurality of levels. Referring to FIG. 3, the intermediate control cores may be hierarchically grouped according to the number of processing cores to which work groups are allocated by the intermediate control cores. In this case, high-level intermediate control cores 341 allocate work groups to low-level intermediate control cores 342.

Figure 4:
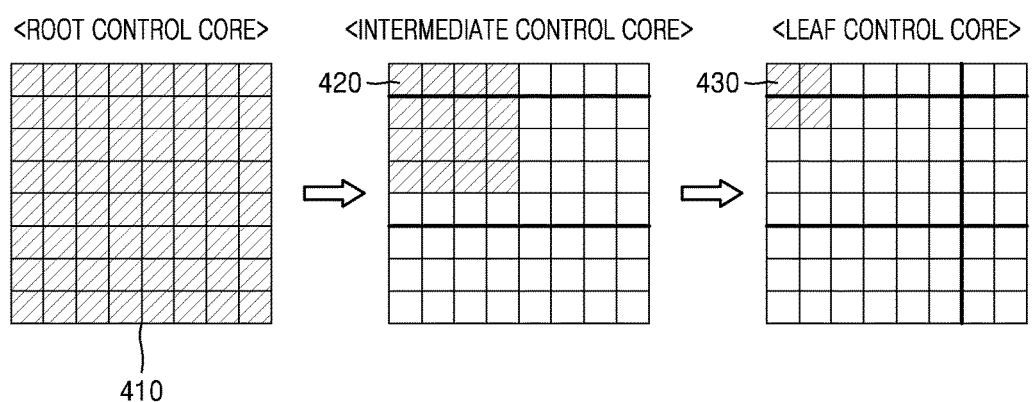
FIG. 4 is a view illustrating the number of processing cores to which work groups are allocated by control cores, according to an exemplary embodiment of the inventive concept.

FIG. 4 is a view illustrating the number of processing cores to which work groups are allocated by control cores, according to an exemplary embodiment of the inventive concept.

According to the embodiment, the control cores of the control core group 210 are hierarchically grouped according to the number of processing cores to which work groups are allocated by the control cores.

FIG. 4 is a view illustrating a processing core group including 8×8 processing cores. Referring to FIG. 4, processing cores 410 to which work groups are allocated by the root control core 330 are all the processing cores of the processing core group.

One intermediate control core may allocate work groups to some of processing cores 420 of the processing core group. For example, in the case shown in FIG. 4, if the intermediate control core group 340 includes four intermediate control cores, the number of processing cores to which one intermediate control core can allocate work groups may be sixteen. The number of processing cores to which one intermediate control core allocates work groups may be different from the number of processing cores to which another intermediate control core allocates work groups. For example, when 64 processing cores and 4 intermediate control cores are available, rather than each intermediate control core allocating work groups to 16 processing cores, one intermediate control core could allocate work groups to 15 processing cores while another intermediate control core allocates work groups to 17 processing cores.

In an embodiment, a leaf control core receives information about work groups allocated by high-level control cores and may directly allocate the work groups to the processing cores. For example, one leaf control core may allocate work groups to some of processing cores 430 of the processing cores 420 to which work groups are allocated by one intermediate control core. That is, the number of processing cores to which work groups are allocated by one leaf control core is less than the number of processing cores to which work groups are allocated by one intermediate control core. For example, if an intermediate control core is managing 16 processing cores, a leaf control core might only manage 4 processing cores.

In addition, according to an embodiment of the inventive concept, since leaf control cores allocate work groups to processing cores adjacent thereto, work groups exhibiting locality may be allocated according to the locality with low overhead.

In addition, since the computing device 200 of the embodiment includes the control core group 210 in addition to the processing core group 220, all processing cores may process work groups. In addition, since the control core group 210 is hierarchically organized, dynamic allocation of work groups may be efficiently performed. A method of dynamically allocating work groups using hierarchically grouped control cores will now be described with reference to FIG. 5.

Figure 5:
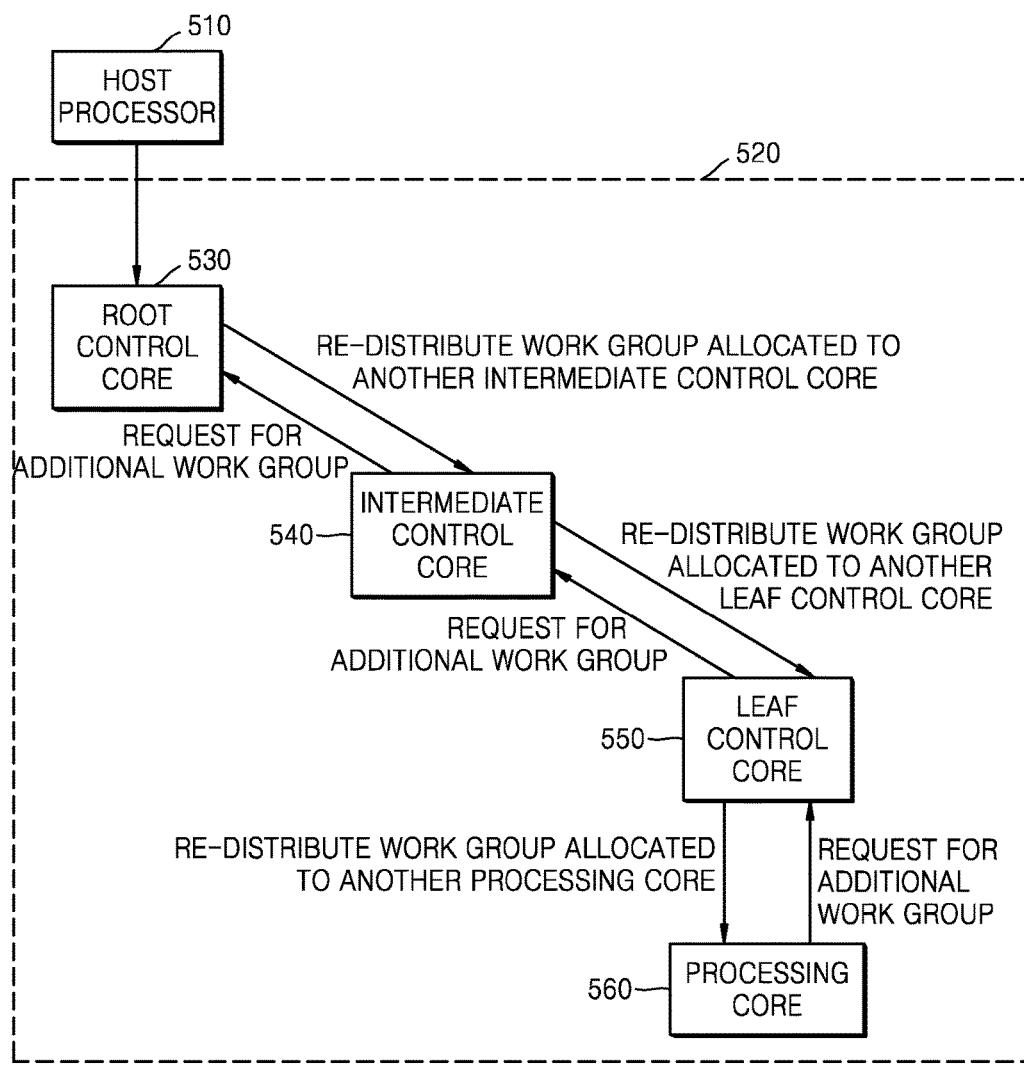
FIG. 5 is a view illustrating a method of dynamically allocating work groups for executing an OpenCL kernel, according to an exemplary embodiment of the inventive concept.

FIG. 5 is a view illustrating a method of dynamically allocating work groups for executing an OpenCL kernel, according to an embodiment of the inventive concept.

According to the embodiment, a control core group re-allocates work groups to other low-level control cores and other processing cores according to results of processing of work groups by low-level control cores and processing cores. A host processor 510 shown in FIG. 5 corresponds to the host processor 310 shown in FIG. 3, and thus a detailed description thereof will be omitted. A computing device 520 shown in FIG. 5 may correspond to the computing device 300 shown in FIG. 3.

Referring to FIG. 5, if a work group allocated to a processing core 560 has completely processed, a work group that has been allocated to another processing core may be re-allocated to the processing core 560 by a leaf control core 550. In addition, the leaf control core 550 may send a request for an additional work group to an intermediate control core 540. In this case, the leaf control core 550 may receive a request for an additional work group from the processing core 560 or may periodically check processing of a work group in the processing core 560 to determine whether the work group allocated to the processing core 560 has completely processed.

If a work group allocated to the leaf control core 550 has completely processed, a work group that has been allocated to another leaf control core may be re-allocated to the leaf control core 550 by the intermediate control core 540. In addition, the intermediate control core 540 may send a request for an additional work group to a root control core 530.

For example, if a first processing core has finished processing a first workgroup and a second processing core is still processing a second workgroup, instead of waiting for the second processing core to complete processing of the second work group, the leaf control core associated with the second processing core can send a third workgroup to the first processing core even though the third workgroup was scheduled to be next processed on the second processing core. The leaf control core associated with the second processing core may determine that the first processing core can handle this assignment after being notified by an intermediate control core that receives a request from the leaf control core associated with the first processing core. The leaf control core associated with the first processing core may send the request in response to a request from the first processing core for an additional workgroup after completing the first process.

If a work group allocated to the intermediate control core 540 has completely processed, a work group that has been allocated to another intermediate control core may be re-allocated to the intermediate control core 540 by the root control core 530.

In addition, when work groups for executing an OpenCL kernel are processed, if the root control core 530 receives information about execution of a new OpenCL kernel from the host processor 510, the root control core 530 may re-allocate work groups allocated to a processing core group.

In an embodiment, the intermediate control core 540 illustrated in FIG. 5 is omitted, and thus the root control core 530 communicates directly with the leaf control core 560. For example, in this embodiment, the leaf control core 560 forwards a request from the processing core 560 for an additional work group to the root control core 530.

Figure 6:
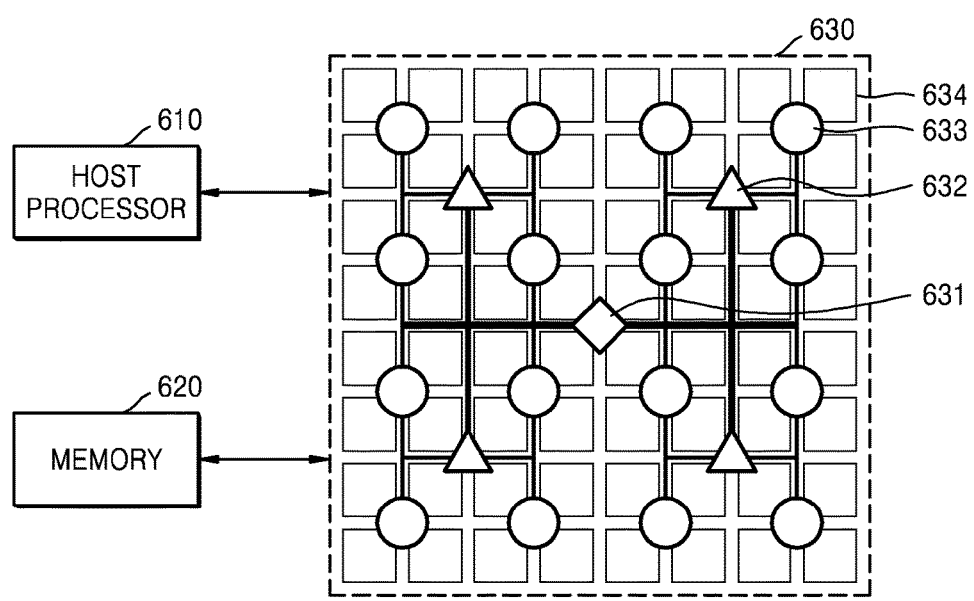
FIG. 6 is a view illustrating a computing device according to an exemplary embodiment of the inventive concept.

FIG. 6 is a view illustrating a computing device 630 according to an exemplary embodiment of the inventive concept.

Referring to FIG. 6, the computing device 630 is connected to a host processor 610 and a memory 620. In addition, the computing device 630 includes a root control core 631, leaf control cores 633, and processing cores 634. According to the hierarchy of a control core group, the computing device 630 may further include intermediate control cores 632.

Referring to FIG. 6, the root control core 631 is connected to the intermediate control cores 632. Therefore, the root control core 631 may transmit information about work groups allocated to the processing cores 634 to the intermediate control cores 632 or the leaf control cores 633 instead of directly accessing the processing cores 634 to allocate work groups. Since the intermediate control cores 632 are connected to the leaf control cores 633, the intermediate control cores 632 may transmit information about work groups allocated to some processing cores of a processing core group to the leaf control cores 633. Since the leaf control cores 633 are connected to the processing cores 634, the leaf control cores 633 may directly transmit information about allocated work groups to the processing cores 634.

Since the root control core 631 is connected to the host processor 610, the root control core 631 may receive information about work groups generated when an OpenCL kernel is executed. In addition, cores of the control core group and the processing core group may receive information necessary for allocating and processing work groups from the memory 620.

Figure 7:
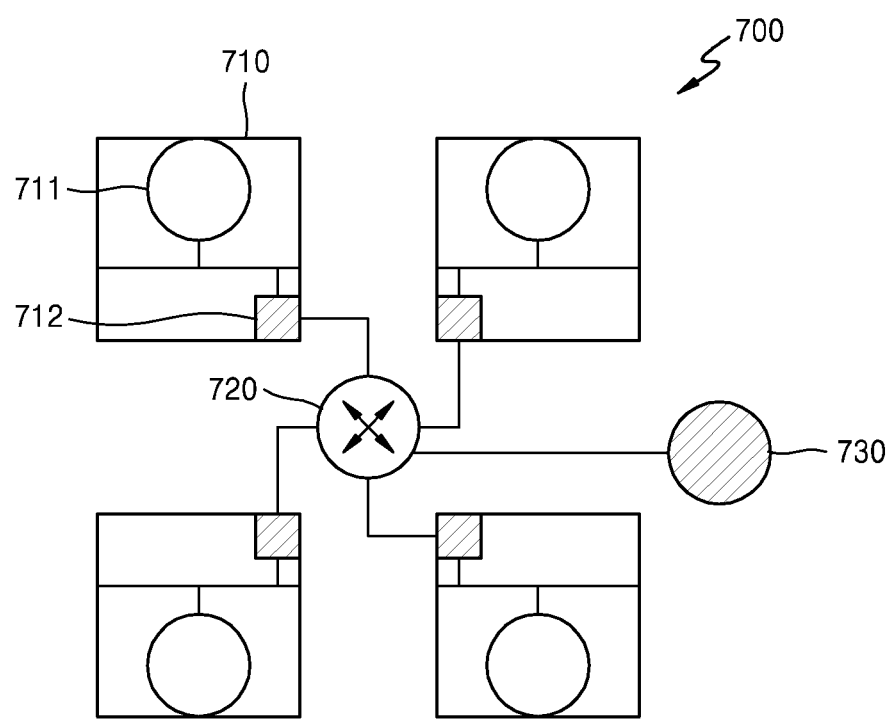
FIG. 7 is view illustrating a leaf control core and processing cores, according to an exemplary embodiment of the inventive concept.

FIG. 7 is view illustrating a computing device 700 including a leaf control core 730 and processing cores 710, according to an exemplary embodiment of the inventive concept.

According to the embodiment, the leaf control core 730 allocates work groups to the processing cores 710. For example, referring to FIG. 7, the leaf control core 730 may be connected to four processing cores 710 to directly allocate work groups to the processing cores 710 and receive results of work group processing or a request for additional work groups.

In addition, each of the processing cores 710 may include a core 711 configured to process work groups, and a router 712 for communication with external devices. In an embodiment, the processing cores 710 are connected to an external router 720 through the routers 712, and the external router 720 is connected to the leaf control core 730. Therefore, the processing cores 710 may receive information about work groups from the leaf control core 730. In FIG. 7, each of the processing cores 710 includes one core 711. However, the number of cores included in each of the processing cores 710 is not limited thereto.

The routers 712 and the external router 720 may communicate with each other by a network on chip (NoC) communication method or a bus communication method. However, communication between the routers 712 and the external router 720 is not limited thereto.

In addition, referring to FIG. 7, the leaf control core 730 may allocate work groups to four processing cores 710. However, the number of processing cores to which the leaf control core 730 allocates work groups is not limited thereto.

FIG. 8 illustrates an OpenCL kernel code executed on processing cores, according to an exemplary embodiment of the inventive concept.

The OpenCL kernel code shown in FIG. 8 is for adding elements of a matrix (a) and elements of a matrix (b) and storing results thereof in a matrix (c). Since the matrices (a) and (b) are two-dimensional matrices, a two-dimensional work group space may be used to execute the OpenCL kernel code shown in FIG. 8. In other words, elements of the matrices (a) and (b) may be work items which are points of a work space.

If the OpenCL kernel code shown in FIG. 8 is executed on the computing device 630 shown in FIG. 6, the processing cores 634 may access the memory 620 to read elements of the matrices (a) and (b). Here, get_global_id( ) is a function for reading indexes of a kernel code. Therefore, when the processing cores 634 execute the OpenCL kernel code shown in FIG. 8, a plurality of work items may be processed in parallel. However, since it is necessary to repeatedly access the memory 620 to read the work items, the time necessary for processing the OpenCL kernel code may increase.

Figure 9:
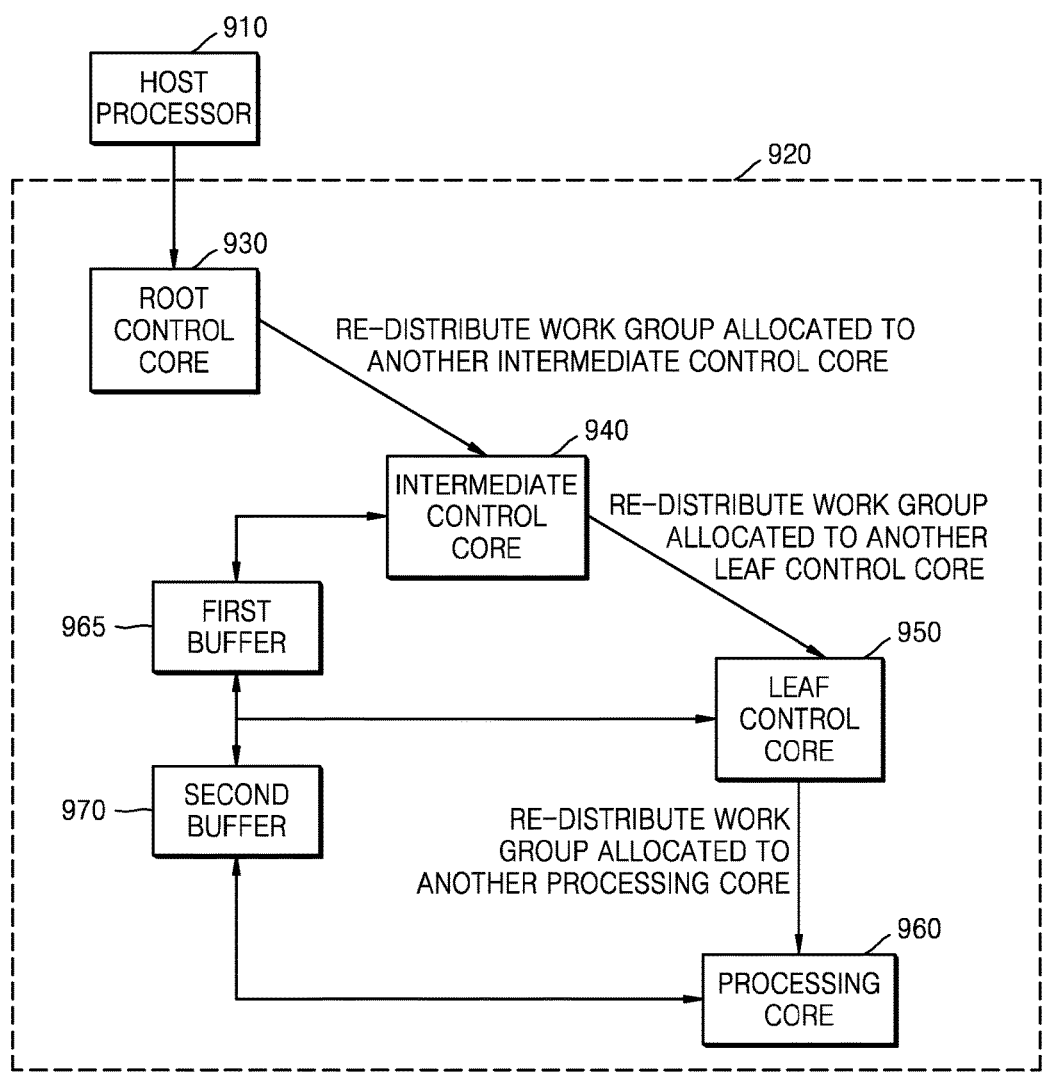
FIG. 9 is a view illustrating a computing device according to an exemplary embodiment of the inventive concept.

FIG. 9 is a view illustrating a computing device 920 according to an exemplary embodiment of the inventive concept.

The computing device 920 of the embodiment may further include buffers such as first and second buffers 965 and 970 to store information about work groups. Since the computing device 920 includes the buffers, the computing device 920 may read information about work groups from the buffers and thus may access memory relatively fewer times. A host processor 910 and a root control core 930 shown in FIG. 9 correspond to the host processor 510 and the root control core 530 shown in FIG. 5, and thus detailed descriptions thereof will be omitted.

Referring to FIG. 9, a leaf control core 950 and a processing core 960 are connected to the second buffer 970. In an embodiment, the second buffer 970 receives from the leaf control core 950 the number and the identifications (IDs) of work groups allocated to the processing core 960 and stores the number and the IDs of work groups. Therefore, the leaf control core 950 may check results of processing of work groups in the processing core 960 by reading information about work groups allocated to the processing core 960 from the second buffer 970, instead of accessing memory. If the leaf control core 950 determines that a work group allocated to the processing core 960 has completely processed, the leaf control core 950 may re-allocate a work group that has been allocated to another processing core to the processing core 960. In an embodiment, the second buffer 970 is included in the processing core 960 and is connected to the leaf control core 950 through a router of the processing core 960. However, the position of the second buffer 970 is not limited thereto.

In an embodiment, an intermediate control core 940 and the leaf control core 950 are connected to the first buffer 965. In an embodiment, the first buffer 965 receives, from the intermediate control core 940, the number and the IDs of work groups allocated to the leaf control core 950, and stores the number and the IDs of work groups. Therefore, the intermediate control core 940 may check results of processing of work groups in the leaf control core 950 by reading information about work groups allocated to the leaf control core 950 from the first buffer 965, instead of accessing memory. If the intermediate control core 940 determines that a work group allocated to the leaf control core 950 has completely processed, the intermediate control core 940 may re-allocate a work group that has been allocated to another leaf control core to the leaf control core 950. In an embodiment, the first buffer 965 is included in the leaf control core 950. However, the position of the first buffer 965 is not limited thereto.

In FIG. 9, the computing device 920 includes two buffers, that is, the first and second buffers 965 and 970. However, the number of buffers of the computing device 920 is not limited thereto.

Figure 10:
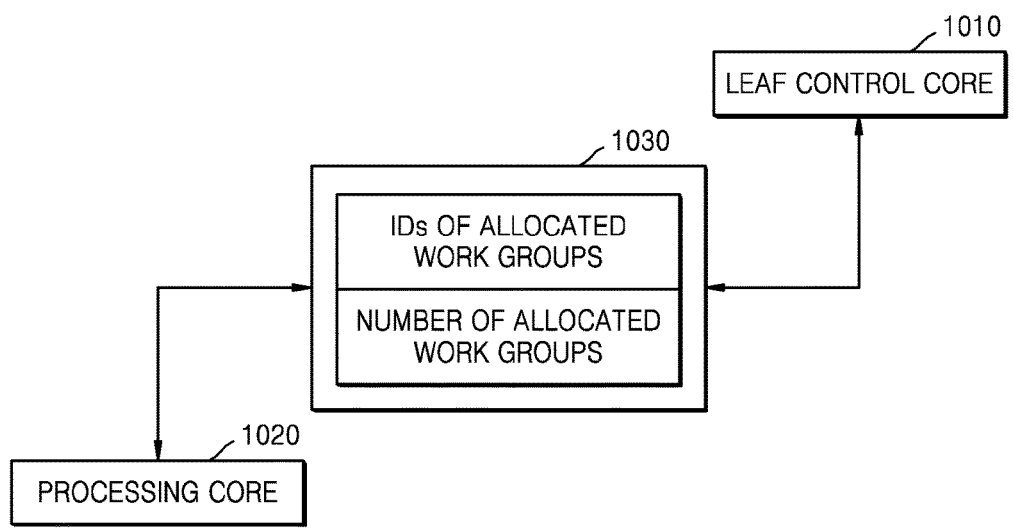
FIG. 10 is a view illustrating a buffer according to an exemplary embodiment of the inventive concept.

FIG. 10 is a view illustrating a buffer 1030 according to an exemplary embodiment of the inventive concept. The first buffer 965 or the second buffer 970 of FIG. 9 may be implemented by the buffer 1030 of FIG. 10.

Referring to FIG. 10, the buffer 1030 is connected to a leaf control core 1010 and a processing core 1020. In addition, the buffer 1030 stores the number and the IDs of work groups allocated to the processing core 1020.

In an embodiment, the leaf control core 1010 allocates work groups to the processing core 1020 and then sends the IDs and the number of the work groups allocated to the processing core 1020 to the buffer 1030. After processing a work group, the processing core 1020 may access the buffer 1030 to update the number of work groups allocated to the processing core 1020. Therefore, the leaf control core 1010 may check results of processing work groups in the processing core 1020 by accessing the buffer 1030 instead of accessing memory. For example, the processing core 1030 could decrement the number of allocated work groups after completing processing of a workgroup.

FIG. 11 illustrates an OpenCL kernel code executed on processing cores of a computing device including a buffer, according to an exemplary embodiment of the inventive concept.

The OpenCL kernel code shown in FIG. 11 is a code using the buffer 1030 to perform the same function as the function of the OpenCL kernel code shown in FIG. 8. In other words, the OpenCL kernel code is executed on the processing core 1020 to which the buffer 1030 is added, so as to add elements of matrices (a) and (b) and store results of the addition in a matrix (c).

Referring to FIG. 11, read_wg_id( ) is a function for reading, from the buffer 1030, the IDs of work groups allocated to the processing core 1020. Therefore, since the OpenCL kernel code uses the IDs of work groups stored in the buffer 1030 as indexes by using the function read_wg$_{13}$ id( ), the processing core 1020 may process work groups in parallel without accessing memory.

FIG. 12 illustrates an OpenCL kernel code for executing OpenCL work groups when a computing device includes a buffer, according to an exemplary embodiment of the inventive concept.

According to the embodiment, if the processing core 1020 includes one or more processing elements, and the number of the processing elements is less than the number of work items of a work group, a computing device converts an OpenCL kernel so that the processing elements serialize the work items and sequentially perform the work items.

For example, if the number of processing elements is less than the number of work items of a work group, each of the processing elements may process a plurality of work items. In this case, whenever each of the processing elements completely processes a work item allocated thereto, the processing element may store information about the completely processed work item in memory and switch to the next work item. Therefore, when a processing element processes a plurality of work items, the number of times the processing element accesses memory may increase.

The computing device may convert the OpenCL kernel code, based on a work item coalescing method, so as to enable each processing element to process a plurality of work items in series, and thus to reduce the number of times the processing element accesses memory. In an embodiment, an iterative statement is enclosed in the kernel code so that the kernel code may be executed a number of times equal to the number of work items to be serialized. The iterative statement may be referred to as a work-item coalescing loop (WCL) or a thread loop.

Referring to FIG. 12, read_num_wgs( ) is a function for reading, from the buffer 1030, the number of work groups allocated in succession to the processing core 1020.

Therefore, since the OpenCL kernel code shown in FIG. 12 sets indexes based on the functions read_wg_id( ) and read_num_wgs( ) for reading information from the buffer 1030, the number of times the processing core 1020 accesses memory may be reduced. In addition, since a loop surrounds the OpenCL kernel code, it is not necessary to call the OpenCL kernel code each time a work item is executed. That is, a plurality of work items may be sequentially performed by calling the OpenCL kernel code just once. Therefore, the number of times the processing core 1020 accesses memory may be reduced as compared to a case in which the work item coalescing method is not used.

FIGS. 13 and 14 are tables illustrating experimental conditions for evaluating the performance of computing devices according to exemplary embodiments of the inventive concept.

FIG. 13 is a table showing delay times necessary for computing devices provided according to an embodiment to allocate work groups when different scheduling methods are applied to the computing devices. A processing core group of each of the computing devices includes ninety-six processing cores, and a control core group of each of the computing devices includes a root control core, four intermediate control cores, and sixteen leaf control cores. In an embodiment, the control cores operate at a clock frequency of 50 MHz, and the processing cores operate at a clock frequency of 500 MHz.

In FIG. 13, Concentrated Scheduling refers to a scheduling method in which a control core dynamically allocates work groups to all processing cores. In addition, Distributed Scheduling refers to a scheduling method in which hierarchically grouped control cores dynamically allocate work groups to processing cores. In addition, Hardware Support refers to whether the computing devices include a buffer.

Referring to FIG. 13, the delay time of a computing device to which the distributed scheduling method is applied is shorter than the delay time of a computing device to which the concentrated scheduling method is applied. That is, it may be understood that a time necessary for hierarchically grouped control cores to dynamically allocate work groups to ninety-six processing cores is shorter than a time necessary for a single control core to dynamically allocate work groups to ninety-six processing cores.

In addition, when the same scheduling method is applied, the delay time of a computing device including a buffer is shorter than the delay time of a computing device including no buffer. Therefore, it may be understood that since the number of times the computing device including a buffer accesses memory is relatively small, the delay time necessary for the computing device to process work groups is relatively short.

Referring to FIG. 14, four different applications are executed to evaluate the performance of computing devices. For example, a PI estimation application takes a longer time to process allocated work groups than other applications. The applications, Small buffer copy and Big buffer copy, access memory more times than the other applications. In addition, an SpMV application irregularly accesses memory, and time periods necessary for the SpMV application to process allocated work groups are not uniform.

Figure 15:
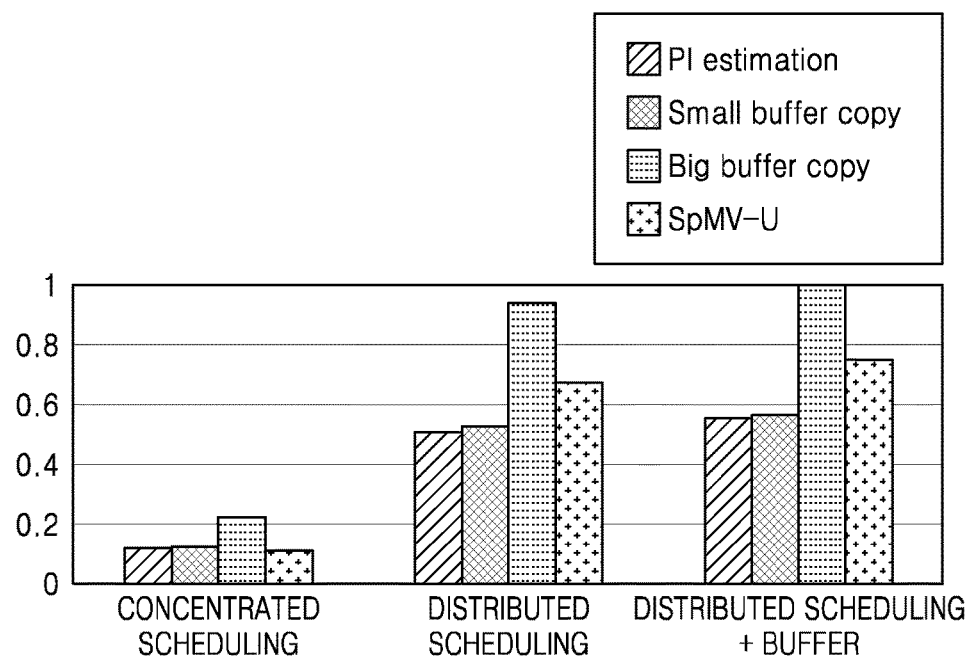
FIG. 15 is a view illustrating results of an evaluation of the performance of computing devices according to exemplary embodiments of the inventive concept.

FIG. 15 is a graph illustrating results of an evaluation of the performance of computing devices according to exemplary embodiments of the inventive concept.

FIG. 15 illustrates results of measurements of scheduling performance of computing devices with respect to execution of the four applications on the computing devices, the results being normalized based on an ideal scheduling performance.

Referring to FIG. 15, the scheduling performance of computing devices to which the concentrated scheduling method is applied is lower than the scheduling performance of computing devices to which the distributed scheduling method is applied. For example, in the case of the SpMV application, the scheduling performance of the computing device to which the concentrated scheduling method is applied is markedly different from the scheduling performance of the computing device to which the distributed scheduling method is applied.

In addition, the scheduling performance of computing devices to which buffers are added and the distributed scheduling method is applied is higher than the scheduling performance of the computing devices to which only the distributed scheduling method is applied. For example, a large scheduling performance difference may be caused by the addition of buffers in the cases of the Small buffer copy and Big buffer copy applications that access memory relatively many times.

Figure 16:
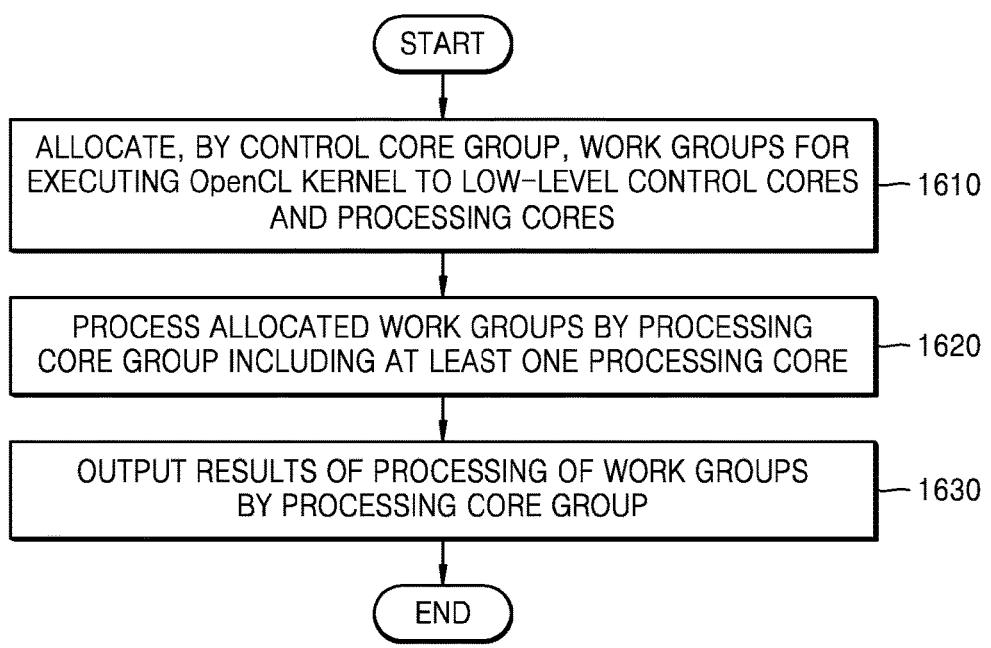
FIG. 16 is a flowchart illustrating a method of processing an OpenCL kernel, according to an exemplary embodiment of the inventive concept.

FIG. 16 is a flowchart illustrating a method of processing an OpenCL kernel according to an exemplary embodiment of the inventive concept.

In operation 1610, a control core group 320 allocates work groups for executing an OpenCL kernel to low-level control cores and processing cores. A plurality of control cores of the control core group 320 may be hierarchically grouped according to the number of processing cores to which work groups are allocated by the control cores.

For example, the control core group 320 may include a root control core 330 and a leaf control core group 350.

If the root control core 330 receives information about execution of an OpenCL kernel, the root control core 330 may allocate work groups to low-level control cores and may send information about the allocated work groups to the low-level control cores. The leaf control core group 350 may include at least one leaf control core and may be configured to receive information about work groups allocated by high-level control cores and allocate the work groups to processing cores.

In addition, the control core group 320 may further include an intermediate control core group 340 including a plurality of intermediate control cores and configured to receive information about work groups allocated by the root control core 330 and allocate the work groups to the leaf control core group 350.

According to an exemplary embodiment, if the intermediate control cores are hierarchically grouped according to the numbers of processing cores to which work groups are allocated by the intermediate control cores, high-level intermediate control cores allocate work groups to low-level control cores in operation 1610.

In operation 1620, a processing core group 360 including at least one processing core processes the work groups allocated by the control core group 320.

In operation 1630, the processing core group 360 outputs results of processing of the work groups.

Figure 17:
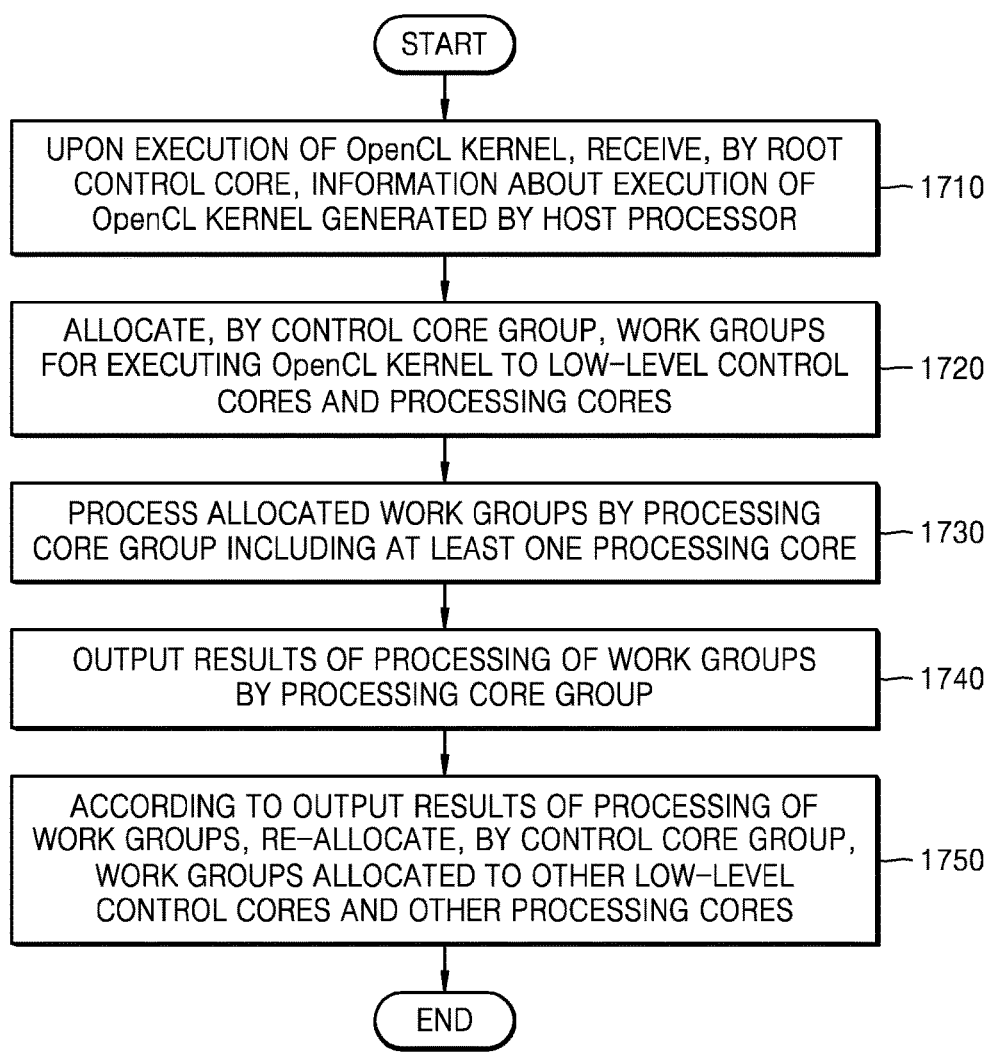
FIG. 17 is a flowchart illustrating a method of processing an OpenCL kernel, according to an exemplary embodiment of the inventive concept.

FIG. 17 is a flowchart illustrating a method of processing an OpenCL kernel according to an exemplary embodiment of the inventive concept.

FIG. 17 illustrates a method of processing an OpenCL kernel using the computing device 300 described with reference to FIG. 16. However, the OpenCL kernel processing method may vary according to the configuration of the computing device 300. In addition, operations 1720, 1730, and 1740 shown in FIG. 17 correspond to operations 1610, 1620, and 1630 shown in FIG. 16, and thus detailed descriptions thereof will be omitted.

In operation 1710, upon execution of an OpenCL kernel, the root control core 330 receives information about the execution generated by the host processor 310. For example, the root control core 330 may receive information about execution of a new OpenCL kernel while processing work groups for executing an OpenCL kernel, and in this case, the root control core 330 may re-allocate work groups allocated to the processing core group 360. Here, information about execution of an OpenCL kernel may include the total number of work groups for executing the OpenCL kernel and information about applications included in the OpenCL kernel.

In addition, according to the embodiment, after the control core group 320 allocates work groups to the processing core group 360, the method of processing an OpenCL kernel may further include: the host processor 310 stopping the execution of the OpenCL kernel, and also collecting and outputting results of the allocation of the work groups.

In addition, according to the embodiment, the method of processing an OpenCL kernel may further include storing information about work groups in a buffer. Here, the information about work groups may include the IDs and the number of work groups allocated to low-level control cores and processing cores.

In operation 1750, the control core group 320 re-allocates work groups allocated to other low-level control cores and other processing cores according to output results of work group processing. For example, according to results of work group processing by intermediate control cores or leaf control cores, the root control core 330 may re-allocate work groups allocated to other intermediate control cores or other leaf control cores. In addition, according to results of work group processing by low-level intermediate control cores or leaf control cores, the intermediate control cores may re-allocate work groups allocated to other low-level intermediate control cores or other leaf control cores. In addition, according to results of work group processing by processing cores, the leaf control cores may re-allocate work groups allocated to other processing cores.

As described above, according to one or more of the above embodiments, since control cores for allocating work groups to processing cores are hierarchically grouped, work groups may be efficiently distributed.

At least one of the embodiments may be implemented in the form of non-transitory recording media storing instructions, executable on computers, such as program modules. Non-transitory computer readable media may be any non-transitory media accessible by a computer, such as volatile media, non-volatile media, separable media, or non-separable media. Examples of computer storage media include volatile media, non-volatile media, separable media, and non-separable media implemented by any method or technique for storing data such as computer instructions, data structures, or program modules.

While one or more embodiments have been described with reference to the figures, it will be understood by those of ordinary skill in the art that various changes in form and details may be made therein without departing from the spirit and scope of the inventive concept.

What is claimed is:

1. A multi-core computing device comprising:
a control core group comprising first low-level control cores, the control core group configured to allocate work groups for executing an Open Computing Language (OpenCL) kernel to the first low-level control cores and first processing cores; and
a processing core group comprising at least one of the first processing cores, the processing core group configured to process the work groups allocated by the control core group and output results of the processing of the work groups,
wherein a plurality of control cores included in the control core group are hierarchically grouped according to a number of the first processing cores to which the work groups are allocated by the control cores,
wherein the control core group comprises:
a root control core configured to allocate the work groups to the first low-level control cores upon receiving information about execution of the OpenCL kernel and transmit information about the allocated work to the first low-level control cores; and
a leaf control core group comprising at least one leaf control core and configured to receive information about work groups allocated by high-level control cores of the control core group and allocate the work groups to the first processing cores.

2. The computing device of claim 1, wherein the control core group is configured to re-allocate work groups allocated to second low-level control cores of the control core group and second processing cores according to results of the processing of the work groups by the first low-level control cores and the first processing cores.

3. The computing device of claim 1, wherein the control core group further comprises an intermediate control core group comprising a plurality of intermediate control cores and configured to receive information about the work groups allocated by the root control core and allocate the work groups to the leaf control core group, wherein the intermediate control cores are hierarchically grouped according to a number of the first processing cores to which the work groups are allocated by the intermediate control cores, and high-level intermediate control cores of the control core group allocate the work groups to low-level intermediate control cores.

4. The computing device of claim 1, wherein as the OpenCL kernel is executed, the root control core receives information generated by a host processor about the execution of the OpenCL kernel.

5. The computing device of claim 4, wherein when the work groups for executing the OpenCL kernel are processed, the root control core re-allocates the work groups allocated to the processing core group upon receiving information about execution of a new OpenCL kernel from the host processor.

6. The computing device of claim 4, wherein after the control core group allocates the work groups to the processing core group, the host processor stops the execution of the OpenCL kernel, and collects and outputs results of the allocation of the work groups.

7. The computing device of claim 1, wherein a given processing core among the first processing cores comprise one or more processing elements, and when a number of the processing elements is less than a number of work items of one of the work groups assigned to the given processing core, the given processing core converts the OpenCL kernel and one of the processing elements uses the converted OpenCL kernel to sequentially execute a number of the work items.

8. The computing device of claim 1, further comprising a buffer configured to store information about the work groups.

9. The computing device of claim 8, wherein the information about the work groups comprises at least one of a number and identifications (IDs) of the work groups allocated to the first low-level control cores and the first processing cores.

10. A method of processing an OpenCL kernel, the method comprising:
    allocating, by a control core group comprising first low-level control cores, work groups for executing an OpenCL kernel to the first low-level control cores and first processing cores;
    processing, by a processing core group comprising at least one of the first processing cores, the allocated work groups; and
    outputting, by the processing core group, results of the processing of the work groups, wherein a plurality of control cores of the control core group are hierarchically grouped according to a number of the first processing cores to which the work groups are allocated by the control cores,
    wherein the control core group comprises:
    a root control core configured to allocate the work groups to the first low-level control cores upon receiving information about execution of the OpenCL kernel and transmit information about the allocated work groups to the first low-level control cores; and
    a leaf control core group comprising at least one leaf control core and configured to receive information about work groups allocated by high-level control cores of the control core group and allocate the work groups to the first processing cores.

11. The method of claim 10, further comprising re-allocating, by the control core group, work groups allocated to second low-level control cores of the control core group and second processing cores according to the results of the processing of the work groups.

12. The method of claim 10, wherein the control core group further comprises an intermediate control core group comprising a plurality of intermediate control cores and configured to receive information about the work groups allocated by the root control core and allocate the work groups to the leaf control core group, wherein if the intermediate control cores are hierarchically grouped according to a number of the first processing cores to which the work groups are allocated by the intermediate control cores, the allocating of the work groups comprises allocating, by high-level intermediate control cores of the control core group, the work groups to low-level intermediate control cores of the control core group.

13. The method of claim 10, further comprising receiving, by the root control core, information generated by a host processor about execution of the OpenCL kernel when the OpenCL kernel is executed.

14. The method of claim 13, further comprising re-allocating, by the root control core, the work groups allocated to the processing core group upon receiving information about execution of a new OpenCL kernel from the host processor when the work groups for executing the OpenCL kernel are processed.

15. The method of claim 10, wherein a given processing core among the first processing cores comprise one or more processing elements, and when a number of the processing elements is less than a number of work items of one of the work groups assigned to the given processing core, the processing of the work groups comprises the given processing core converting the OpenCL kernel and one of the processing elements using the converted OpenCL kernel to sequentially execute a number of the work items.

16. The method of claim 10, further comprising storing information about the work groups in a buffer.

17. The method of claim 16, wherein the information about the work groups comprises at least one of a number and IDs of the work groups allocated to the first low-level control cores and the first processing cores.

18. A non-transitory computer-readable recording medium on which a method of executing the method of claim 10 on a computer is recorded.

* * * * *